US007346050B2

(12) United States Patent
Benner et al.

(10) Patent No.: US 7,346,050 B2
(45) Date of Patent: Mar. 18, 2008

(54) METHOD, SYSTEM, AND STORAGE MEDIUM FOR DELAY OPTIMIZATION FOR SCHEDULING IN BUFFERLESS CROSSBAR SWITCHES

(75) Inventors: Alan F. Benner, Poughkeepsie, NY (US); Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 11/047,510

(22) Filed: Jan. 31, 2005

(65) Prior Publication Data

US 2006/0171381 A1    Aug. 3, 2006

(51) Int. Cl.
*H04L 12/50* (2006.01)
(52) U.S. Cl. ...................... 370/386; 370/419
(58) Field of Classification Search ............. None
See application file for complete search history.

(56) References Cited

U.S. PATENT DOCUMENTS

| 4,331,956 | A | 5/1982 | Anderson | 340/825.89 |
| 4,630,045 | A | 12/1986 | Georgiou | 340/825.79 |
| 5,072,366 | A | 12/1991 | Simcoe | 395/200 |
| 5,255,265 | A | 10/1993 | Eng et al. | 370/60 |
| 5,267,235 | A | 11/1993 | Thacker | 370/60 |
| 5,301,055 | A | 4/1994 | Bagchi et al. | 359/139 |
| 5,377,182 | A | 12/1994 | Monacos | 370/16 |
| 5,432,788 | A | 7/1995 | Ozveren | 370/85.7 |
| 5,499,238 | A | 3/1996 | Shon | 370/60.1 |
| 5,500,858 | A | 3/1996 | McKeown | 370/60 |
| 5,515,363 | A | 5/1996 | Ben-Nun et al. | 370/17 |
| 5,517,495 | A | 5/1996 | Lund et al. | 370/60 |
| 5,631,908 | A | 5/1997 | Saxe | 370/235 |
| 5,784,372 | A | 7/1998 | Faulds | 370/398 |
| 5,956,342 | A | 9/1999 | Manning et al. | 370/414 |
| 5,974,467 | A | 10/1999 | Haddock et al. | 709/240 |
| 6,023,471 | A | 2/2000 | Haddock et al. | 370/426 |
| 6,028,843 | A | 2/2000 | Delp et al. | 370/235 |
| 6,098,109 | A | 8/2000 | Kotzur et al. | 709/249 |
| 6,185,221 | B1 | 2/2001 | Aybay | 370/412 |
| 6,563,837 | B2 | 5/2003 | Krishna et al. | 370/413 |
| 6,661,788 | B2 * | 12/2003 | Angle et al. | 370/390 |
| 6,697,359 | B1 | 2/2004 | George | 370/357 |
| 7,158,512 | B1 * | 1/2007 | Kamhine | 370/389 |
| 2003/0133447 | A1 * | 7/2003 | Benayoun et al. | 370/360 |
| 2003/0214944 | A1 * | 11/2003 | Towles | 370/388 |
| 2004/0100948 | A1 * | 5/2004 | Yang et al. | 370/380 |
| 2004/0165598 | A1 * | 8/2004 | Shrimali et al. | 370/395.42 |

* cited by examiner

*Primary Examiner*—Bob A. Phunkulh
(74) *Attorney, Agent, or Firm*—Cantor Colburn LLP; Lily Neff

(57) ABSTRACT

A control topology for distributed scheduling has a two-dimensional fanout broadcast network, which may include logical partitioning. Logically, a switch is in the center and line cards are in a two-dimensional grid. There are multiple broadcast networks along rows and columns. Each line card broadcasts to all the other line cards in its row and column. Then, each line card aggregates requests in its row and forwards the aggregated data to all the other line cards in its column.

5 Claims, 4 Drawing Sheets

MEHTOD, SYSTEM, AND STORAGE MEDIUM FOR DELAY OPTIMIZATION FOR SCHEDULING IN BUFFERLESS CROSSBAR SWITCHES

BACKGROUND OF THE INVENTION

1. Field of the Invention

The present invention relates generally to network computing, data transmission, Gigabit Ethernet, high speed data transmission, high speed networking, data coding and encoding, data assembly and formatting, cluster computers, parallel processing computers, InfiniBand networks, high performance computing, supercomputing and, in particular, to delay optimization, electrical and crossbar switches, and scheduling.

2. Description of Related Art

FIG. 1 shows a prior art data crossbar switch scheduling structure. The scheduling structure includes a control broadcast network 100 and partial schedulers 102 in each line card that separately control the operation of each line card on the basis of global control information. There are a number of pairs of ingress line cards 104 and egress line cards 106 equal to the number of ports on the data crossbar switch 108. The control broadcast network 100 broadcasts requests from the ingress half 104 of each line card to the partial schedulers 102 of all the other line cards.

In operation of the scheduling structure of FIG. 1, each line card can calculate, based on received requests, which line card its ingress half should send to and which line card its egress half should receive from, at any given time.

There is a need to improve upon the prior art data scheduling structure in several ways. First, in the prior art scheduling structure, each partial scheduler must have a control input port for receiving requests (control information) from every other line card on the switch. Therefore, the total number of control input ports for the whole switching fabric scales as $n^2$. For low numbers of line cards (e.g., 8 or less), the number of control input ports is manageable (e.g., 64 or less). However, for switching fabrics with high port counts (e.g., 32 or 64), the number of control input ports scales dramatically (e.g., to 1,024 or 4,096), drastically increasing the cost of the overall switching fabric. Second, in the prior art scheduling structure, the control broadcast network must replicate the control information from each ingress line card half to every other line card half. This replication operation also results in $O(N^2)$ scaling of the number of outputs of the control broadcast network and $O(N)$ scaling of the replication factor for each input port's information, which becomes extremely difficult to implement as the number of switch ports is increased. Third, in the prior art scheduling structure, each partial scheduler must receive a separate control request from each ingress line card half. Each request is packed and transmitted as a packet generated by the ingress card half and received by each partial scheduler. Because each packet has some per-packet overhead, for packet framing and error correction and because the ratio of this overhead to useful request payload information decreases with larger requests, the overhead could be reduced by aggregating requests together, such that each partial scheduler only needs to receive fewer individual packets containing request information.

There is a need for scalability to large systems, such as 32 or 64 line cards that require 1,024 or 4,096 control ports in conventional switches. There is a need for there is a need for scalability of broadcast network replication operations and network outputs and there is a need to reduce per-packet overhead.

BRIEF SUMMARY OF THE INVENTION

The present invention is directed to a method, system, and storage medium for delay optimization scheduling in bufferless crossbar switches that satisfies these needs and others.

One aspect is a method for delay optimization scheduling in bufferless crossbar switches. Each line card of a plurality of line cards logically organized into rows and columns transmits scheduling information to a horizontal control broadcast network and a vertical control broadcast network. Each line card receives a plurality of requests from the horizontal and the vertical control broadcast networks connected to it. The requests are from the other line cards in its row and its column. Each line card performs a two-phase distribution of the requests. Each line card determines its partial schedule based on the scheduling information and the requests and sends data according to the partial schedule through a bufferless crossbar switch.

Another aspect is a storage medium storing instructions for performing this method.

A further aspect is a system for delay optimization scheduling in bufferless crossbar switches, including a plurality of line cards, a plurality of couplers, and a bufferless crossbar switch. The line cards each have an ingress half, an egress half, and a partial scheduler. The couplers are connected by control links to the line cards in a two-dimensional grid, organizing the line cards into rows and columns. The bufferless crossbar switch is connected by data path links to each line card to the ingress half and the egress half. Control information is distributed in a first stage and a second stage of broadcasts.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE INTENTION

Exemplary methods, systems, and storage mediums are described for delay optimization scheduling in bufferless crossbar switches, such as replicated distributed responseless crossbar switches.

Figure 1:
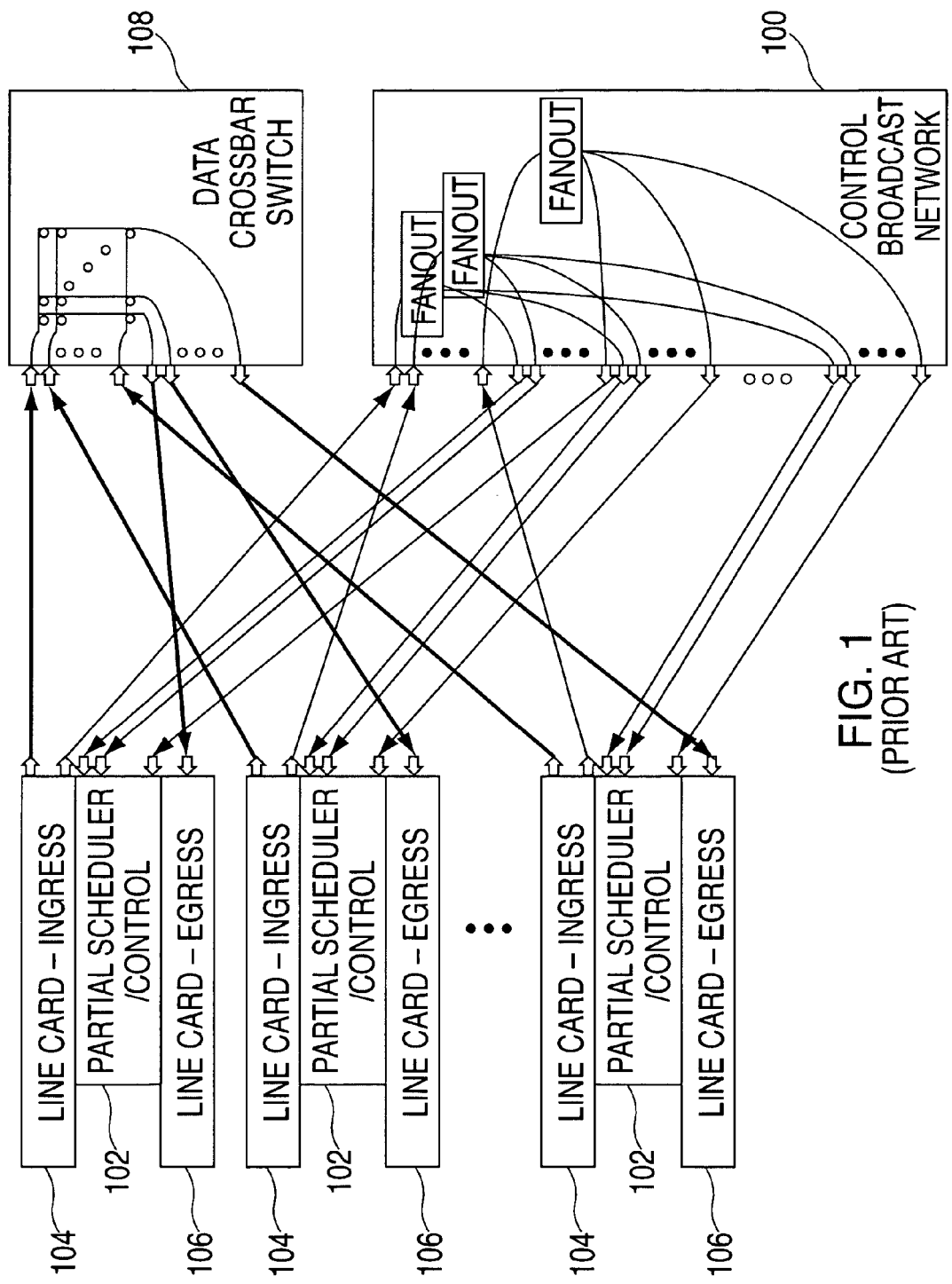
FIG. 1 is a block diagram showing a prior art data crossbar switch scheduling structure.
Figure 2:
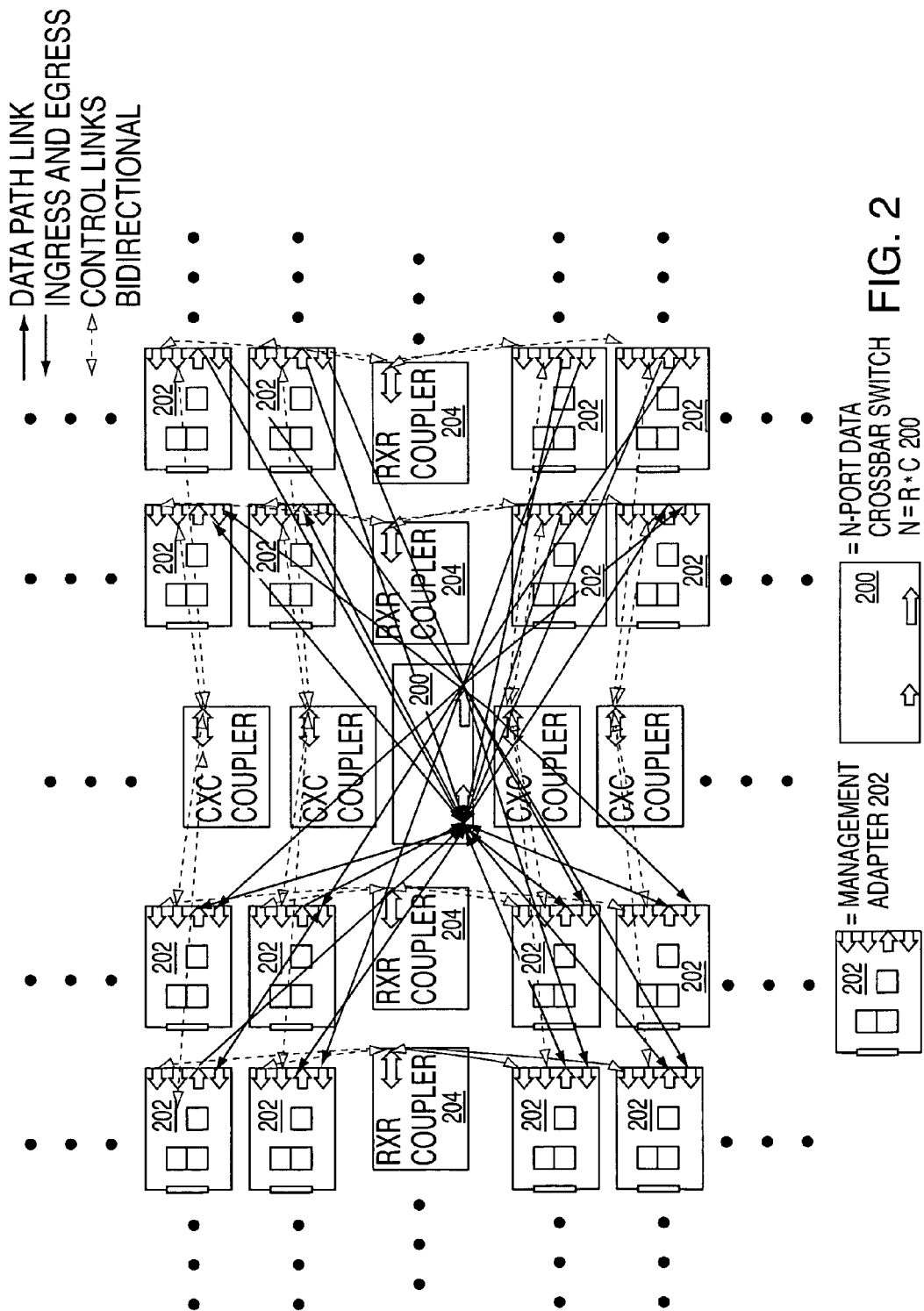
FIG. 2 is a block diagram showing an exemplary embodiment of a switch fabric.

FIG. 2 shows an exemplary embodiment of a switch fabric. The n-way control broadcast network 100 of FIG. 1 is replaced by multiple smaller broadcast networks in the exemplary embodiment of FIG. 2. The switch fabric improves scalability at manageable costs by arranging the control broadcast network as multiple intersecting and redundant two-stage control multicast networks, with distinct but redundant aggregation in each stage.

In this exemplary embodiment, a crossbar data switch 200 is in the center of a number of line cards 202 (or adapters). The line cards 202 are logically arranged in a two-dimensional grid with both horizontal and vertical directions. This horizontal and vertical organization describes the connectivity between the line cards on control links (dashed lines) and may or may not have any relationship to the physical positioning of the line cards 202 relative to each other.

The exemplary embodiment of FIG. 2 replaces the control broadcast network 100 of FIG. 1 with a number of smaller control broadcast networks. Each smaller control broadcast network operates in either the horizontal or vertical direction to link all the line cards 202 in a row or in a column. In this exemplary embodiment, control information is distributed in two stages of broadcasts, across rows and, then, across columns.

This exemplary embodiment includes a two-dimensional fanout broadcast network, which may be implemented with either electrical or optical fanout technology. Logically, the switch 200 is in the center and the line cards 202 are in a two-dimensional grid topology. There are multiple broadcast networks with one along each row and column. Each line card 202 broadcasts to all the cards in its row and column. Each line card 202 aggregates requests in its row to all cards in its column and aggregates requests in its column to all cards in its row.

There are many advantages to this exemplary embodiment. Aggregation of messages across a row and column reduces the per-packet overhead to a single message per row or column. The number of control ports on all the line cards is $2*N*sqrt(N)$, not $N^2$ as in the prior art. For N=64 or 256, this is a factor of 4 or 8 improvement. Each horizontal/vertical broadcast is sqrt(N), rather than N as in the prior art. This saves connections, which is especially important for all-optical architectures, considering the expense of optical components. Another advantage is the simplicity of assuring that each line card 202 may receive two copies of all scheduling data (one distributed first by row and, then, by column and one distributed first by column and, then, by row). This duplicated distribution of data assures that errors are better detected than in the prior art.

In some embodiments, a minimum delay topology is determined for the switch control network based on various switch parameters. Some examples of switch parameters include the number of nodes, the delay overhead for initiating a message, the delay per node hop delay, and others. Cost optimization of the control network may be based on the cost of the transmitter, the cost of the receiver, the cost of the broadcast, the cost of aggregation logic, and the like.

One exemplary embodiment operates as follows. Each line card 202 transmits information approximately simultaneously to the horizontal and vertical control broadcast networks to which the line card 202 is attached. The information transmitted is the information necessary for determining appropriate schedules, such as the status of ingress queues, ingress traffic prioritization, egress buffer availability on the egress portions of the line cards, and other information. Each line card 202 receives a number of requests from the control broadcast networks to which the line card 202 is attached. The requests are from the other line cards 202 in its row and the other line cards in its column. Each line card 202 aggregates the requests from its row in a single message. This message is forwarded to all the other line cards 202 in its column. Each line card 202 aggregates the requests from its column in a separate single message. This message is forwarded to all the other line cards 202 in its row. Of course, other embodiments may do columns first and then rows or any other order of steps.

Once each line card 202 has received the aggregated, forwarded requests from its row and column, it has received requests from all the other line cards 202 on the switch fabric. In fact, each line card 202 received two redundant copies of each request, which serve as a basis for detecting errors in transmission or errors in operation.

The partial scheduler 102 (FIG. 1) in each line card 202 determines the portion of the overall schedule (i.e., a partial schedule) that applies to it based on the aggregated and redundant requests from all the line cards 202.

Once the partial schedules are determined for each line card 202, the line cards 202 send data through the data crossbar switch 200 to/from their ingress sections to their scheduled output ports.

Figure 3:
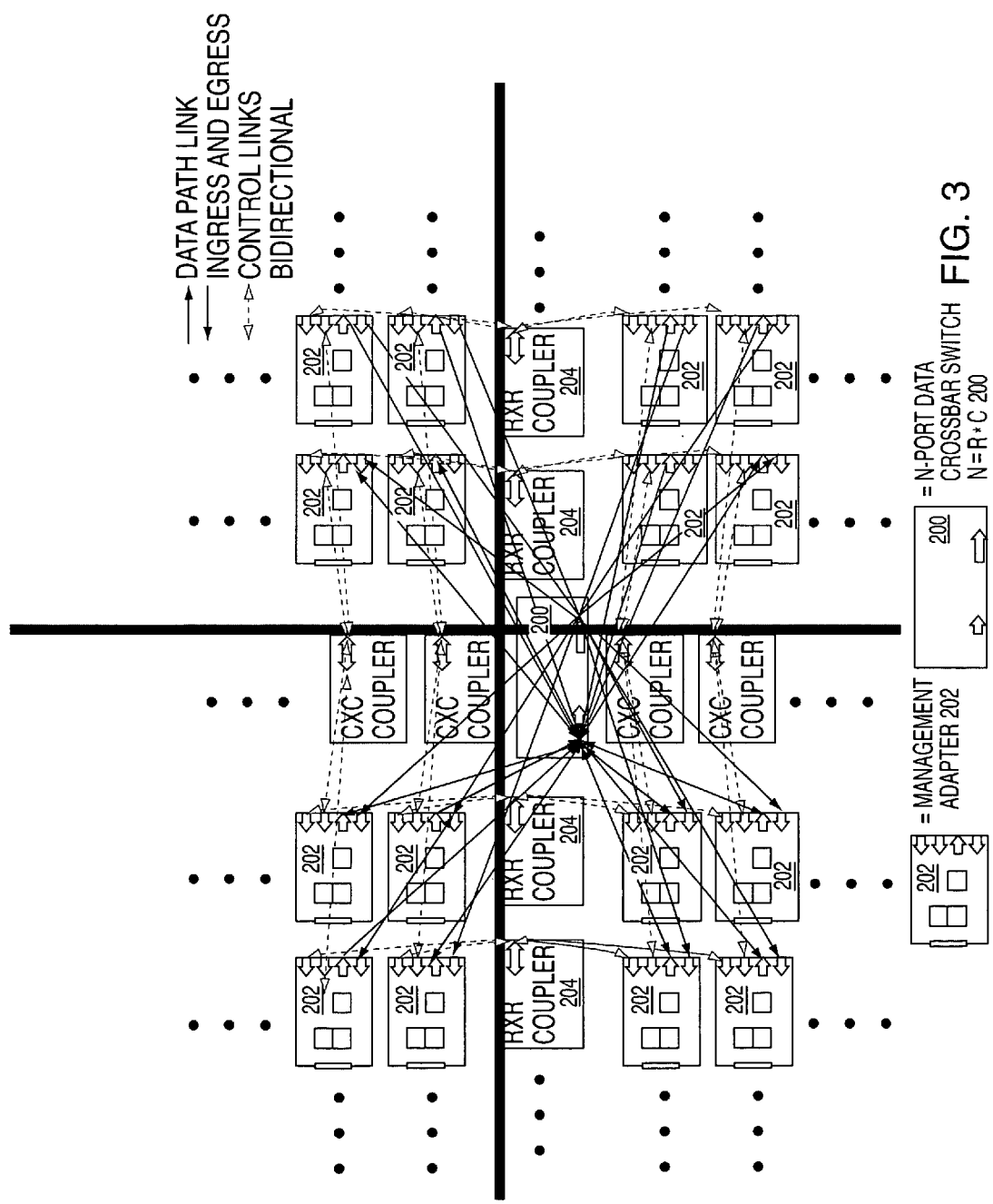
FIG. 3 is a block diagram showing an exemplary embodiment of a logically partitioned switch fabric.

FIG. 3 shows an exemplary embodiment of a logically partitioned switch fabric. The logical grid of FIG. 2 may be divided into smaller square or rectangular grids in various ways in different exemplary embodiments. In FIG. 3, there are four partitions. With partitioning, the switch has some of the advantages of a local area network (LAN) switch without the associated overhead. When this is applied to server architectures that also permit logical partitioning of processor and storage resources, the switches may be partitioned in a complimentary manner. Partitioning is usually accomplished by using a mask in the control plane to limit the range of ports than can address each other. By partitioning (or zoning) the switch, it is possible to provide an effect equivalent to several smaller switches, which is convenient for some types of parallel processing applications. This exemplary embodiment enables new switch architectures with logical partitioning, zoning, and load balancing by masking the control plane.

In some embodiments, different quality of service levels are provided across different switch zones. In some embodiments, traffic is segregated for various purposes. For example, inter-switch traffic and switch-to-node traffic may be partitioned into different zones. In some embodiments, the logical partitions are re-configured in response to changing data traffic conditions. This provides the possibility of load balancing on the switch as well as optimizing utilization of the attached server and/or storage resources. In some embodiments, one or more partitions are configured as backups in case of a failure affecting another partition to increase the reliability of the switch.

For technologies where the per-packet overhead is large enough, it may take less time for a line card 2020 to receive $2*sqrt(N)$ messages, even if half of those messages contain aggregated requests across a whole node or column. In this case, the latency of scheduling may be reduced. The latency of scheduling is the time from the initial transmission of requests until the data can be transmitted through the crossbar.

In one embodiment, requests are originally transmitted both horizontally and vertically and then aggregated and transmitted both vertically and horizontally. At the end of distribution, each line card 202 receives requests from each requesting line card 202 through two different paths with two different aggregations. This allows error checking and filtering out of corrupted messages, before the partial schedulers 102 perform scheduling work.

There are many ways to implement the control broadcast in each of the two dimensions, horizontal and vertical. The architecture of the exemplary embodiment shown in FIG. 2 is well suited to optical cross connect switches. FIG. 2 shows a row or column control broadcast network implemented using optical nxn couplers 204 (with n=R or n=C, where typically R*C=N) in each of the rows and columns. The data paths to and from all nodes are interconnected using a crossbar switch 200 using any of several available electronic or optical technologies to construct the data crossbar.

Suppose an exemplary embodiment has 32 ports with 4 rows and 8 columns, (i.e., R=4 and C=8). In this example, 4×4 couplers and 8×8 couplers are used. Each line card 202 sends requests through a 44×44 coupler to the line cards in each row of its column. Then, the 8×8 couplers in each row are used to fan out requests to the other line cards 202 in each column of each row. This distribution across all rows and all columns replicates data from all the line cards to all the other line cards.

Another exemplary embodiment implements row and column broadcasts with electronic switching application-specific integrated circuits (ASICs). In some embodiments, separate electronic switching ASICs are implemented for the control broadcast networks 100 separately for each row and each column. These embodiments would have electronic switching ASICs in place of the couplers 204 shown in FIG. 2.

Another exemplary embodiment has a single switch for each row and column pair, in order to halve the number of electronic switching ASICs, while doubling the number of ports per ASIC. With this topology, each of the electronic switching ASICs only performs control broadcasting within a row or column separately and the line cards 202 perform aggregation of row and column requests, before broadcasting them to across their columns and rows.

Figure 4:
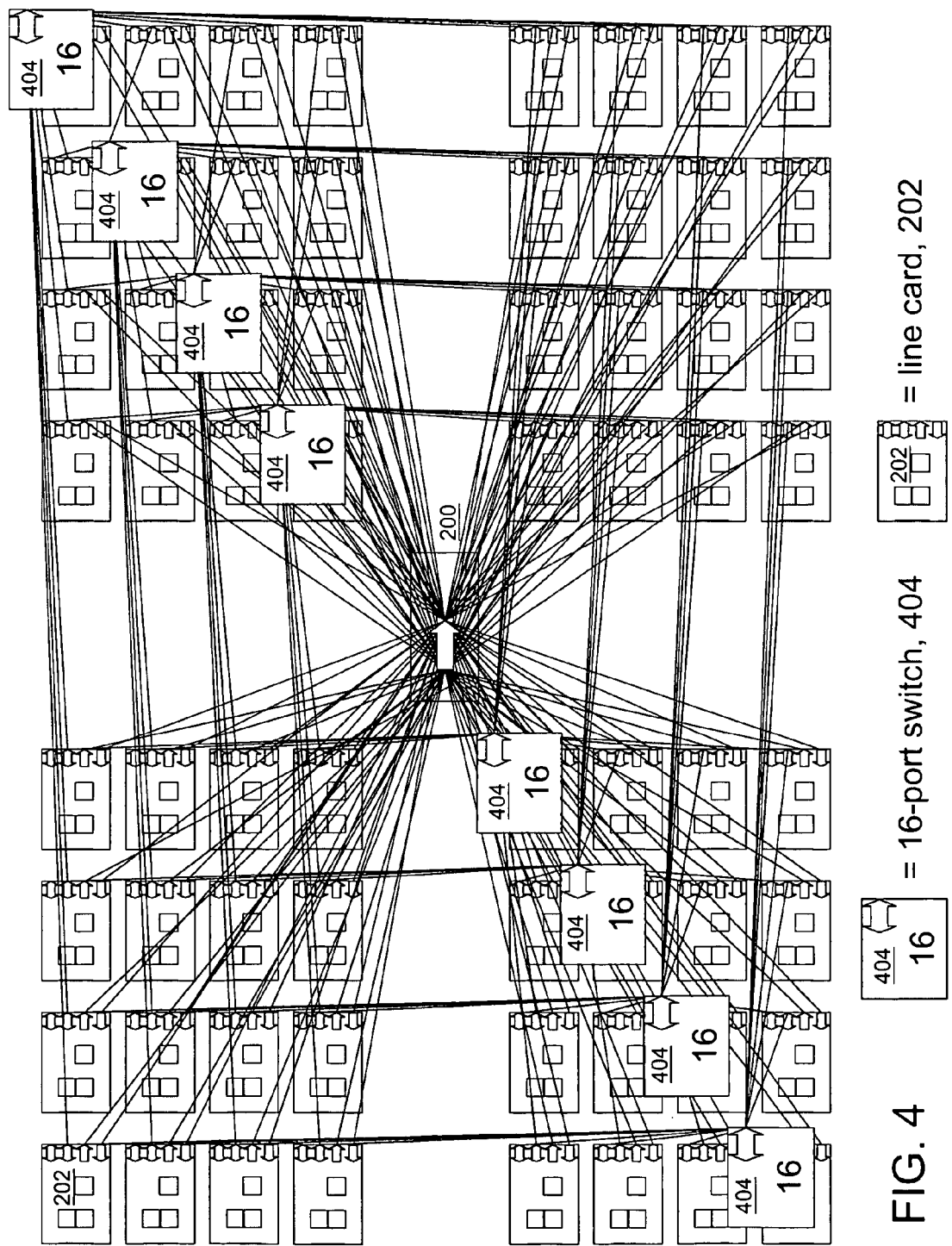
FIG. 4 is a block diagram showing another exemplary embodiment of a switch fabric.

FIG. 4 shows this exemplary embodiment of a switch fabric. Because FIG. 4 shows a 64-port switch fabric with 8 columns and 8 rows, 16-port electronic packet switched ASICs 404 are used to distribute and replicate control information across the rows and columns. FIG. 4 shows eight separate 16-port switches 404 (one switch per row and column, for redundancy and fast connectivity) instead of 16 separate 8-port switches (per row and per column). The packet switches may be InfiniBand switches, or switches of another architecture that is capable of transporting packets carrying control traffic.

The exemplary embodiments of the present invention have many advantages. Because the number of rows and columns are each proportional to sqrt(N), the number of control input ports in the line cards 202 for a switching fabric is $2*N*sqrt(N)$, rather than $N^2$. For N=64, for example, this is reduction of a factor of 4 in overall input ports, possibly significantly decreasing the cost of the control broadcast network 100. Because control broadcast occurs separately in horizontal and vertical directions, each broadcast is only a sqrt(N)-way broadcast, rather than an N-way broadcast. For certain types of broadcast technologies, such as optical broadcast, this may be a significant difference. Each line card receives and manages $2*sqrt(N)$ different control request messages. Although some of the messages contain aggregated and forwarded requests across a row or column, the per-message overhead may be low so that the bandwidth utilization for each line card 202 is reduced. The grid structure allows the switch to be logically partitioned into any desired configuration of subsystems.

As described above, the exemplary embodiments of the invention may be embodied in software, hardware, firmware or any combination thereof. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code. For example, whether stored in a storage medium, loaded into and/or executed by a computer, or transmitted over some transmission medium, such as over electrical wiring or cabling, through fiber optics, or via electromagnetic radiation, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. Furthermore, various components may be implemented in hardware, software, or firmware or any combination thereof. Finally, many modifications may be made to adapt a particular situation or material to the teachings of the invention without departing from the essential scope thereof. Therefore, it is intended that the invention is not to be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for delay optimization scheduling in bufferless crossbar switches, comprising:
    transmitting, by each line card of a plurality of line cards logically organized into rows and columns, scheduling information to a horizontal control broadcast network and a vertical control broadcast network;
    receiving, by each line card, a plurality of requests from the horizontal and the vertical control broadcast networks connected to that line card, the requests being from the other line cards in a same row and a same column as that line card;
    performing, by each line card, a two-phase distribution of the requests;
    determining, by each line card, a partial schedule for that line card based on the scheduling information and the requests; and
    sending, by each line card, data according to the partial schedule through a bufferless crossbar switch.

2. The method of claim 1, wherein each line card transmits the information approximately simultaneously to the horizontal and the vertical control broadcast networks connected to that line card.

3. The method of claim 1, wherein the bufferless crossbar switch is a replicated distributed responseless crossbar switch.

4. The method of claim 1, wherein each line card performs the two-phase distribution of the requests by the following:
    aggregating, by each line card, the requests from the other line cards in the same row as that line card into a single message;
    forwarding, by each line card, the single message to the other line cards in the same column as that line card;
    aggregating, by each line card, the requests from the other line cards in the same column as that line card into a single message; and
    forwarding, by each line card, the single message to the other line cards in the same row as that line card.

5. The method of claim 1, wherein error checking is performed before determining the partial schedule.

* * * * *